US012067073B2

(12) United States Patent
Maddern et al.

(10) Patent No.: US 12,067,073 B2
(45) Date of Patent: Aug. 20, 2024

(54) URL EXCHANGE

(71) Applicant: Button, Inc., Greenwich, CT (US)

(72) Inventors: Christopher James Maddern, New York, NY (US); Wesley Duncan Smith, Windham, ME (US); William Griffin Myers, San Francisco, CA (US); Sean Joey Summers, San Francisco, CA (US)

(73) Assignee: Button, Inc., Greenwich, CT (US)

( * ) Notice: Subject to any disclaimer, the term of this patent is extended or adjusted under 35 U.S.C. 154(b) by 0 days.

(21) Appl. No.: 17/907,884

(22) PCT Filed: Mar. 1, 2021

(86) PCT No.: PCT/US2021/020249
§ 371 (c)(1),
(2) Date: Aug. 29, 2022

(87) PCT Pub. No.: WO2021/174190
PCT Pub. Date: Sep. 2, 2021

(65) Prior Publication Data
US 2023/0153371 A1 May 18, 2023

Related U.S. Application Data

(60) Provisional application No. 62/983,037, filed on Feb. 28, 2020.

(51) Int. Cl.
*G06F 16/95* (2019.01)
*G06F 16/955* (2019.01)

(52) U.S. Cl.
CPC .............................. *G06F 16/9566* (2019.01)

(58) Field of Classification Search
CPC .................................................. G06F 16/9566
See application file for complete search history.

(56) References Cited

U.S. PATENT DOCUMENTS

2014/0129733 A1  5/2014  Klais
2019/0356744 A1* 11/2019  Greenberger ......... H04L 67/306

OTHER PUBLICATIONS

International Search Report including Written Opinion for PCT/US2021/020249 mailed Jun. 23, 2021; 12 pages.

* cited by examiner

*Primary Examiner* — Baoquoc N To
(74) *Attorney, Agent, or Firm* — Lerner David LLP

(57) ABSTRACT

Methods, systems, and apparatus, including computer-readable storage media for uniform resource locator (URL) customization. A request for URL customization may be received by one or more processors. The one or more processors may translate a URL associated with the request into a destination objection. One or more customized links may be generated based on the destination object. The destination object may include one or more of a brand, scheme, host, path, or query. Prior to translating the URL associated with the request into the destination object, the one or more processors may determine whether the URL associated with the request contains a known host by comparing a host of the URL to a list of known hosts.

17 Claims, 9 Drawing Sheets

Request 201
{
  211 "url": "https://www.walmart.com/ip/tv/54898730"
}

Response 220
{
  221 "universal": "https://walmart.bttn.io/ip/tv/54898730",
  222 "ios": "walmart://product/54898730",
  223 "android": "walmartapp://open?product=54898730"
}

FIGURE 2

641 — Groupon: {
652 — toIOSLink: []
653 — toAndroidLink: []
654 — toWebLink: []

FIGURE 6A

```
641 — Groupon: {
652 —   toIOSLink: [
662 —     {
            match: { destination.path == "/" }
            destination: {destination.path = "/home" }
          },
663 —     {
            match: { destination.path link "/product/%1" }
            destination: { destination.query = "product_id = %1" }
          }
        ]
      }
```

FIGURE 6B

```
{
    "supported_hostnames": [
        { "hostname": "groupon.com" },
        { "hostname": "tracking.groupon.com" },
        { "hostname": "groupon.co.uk" },
        { "hostname": "expedia.com" }
    ],
    "supported_bttnio_subdomains": [
        { "subdomain": "groupon" },
        { "subdomain": "expedia" }
    ],
    "supported_affiliates": [
        {
            "hostname": "cj.com",
            "query_url_keys": [
                { "key": "url" },
                { "key": "wurl" }
            ],
            "query_ids": [
                {
                    "key": "aid",
                    "guaranteed_action": true,
                    "values": [
                        { "value": "123-22" },
                        { "value": "1001-1" }
                    ]
                }
            ],
            "pathname_ids": [
                {
                    "guaranteed_action": false,
                    "regex": "(?:/)visit/(\\d{1,})-(\\d{1,})(?:$|\\.*)",
                    "matches": [
                        { "values": ["1", "3"] },
                        { "values": ["2", "4"] },
                        { "values": ["2", "5"] }
                    ]
                }
            ]
        },
        {
            "hostname": "linkshare.com",
            "query_url_keys": [
                { "key": "url" }
            ],
            "query_ids": []
        }
    ]
}
```

FIGURE 8

URL EXCHANGE

CROSS-REFERENCE TO RELATED APPLICATION

The present application claims the benefit of the filing date of U.S. Provisional Application No. 62/983,037, filed Feb. 28, 2020, entitled URL Exchange, the disclosure of which is hereby incorporated herein by reference.

BACKGROUND

Uniform resource locator (URL) provides a unique identification for a particular resource. Selection of the URL may cause a user device to navigate to the resource identified by the URL. However, once created, these URLs are typically not capable of adjusting based on the user device which may try to navigate to the URL. Thus, all user devices which select the URL may navigate to the exact same location. Moreover, unless explicitly programmed with a deep link, these URLs are incapable of providing deep links.

BRIEF DESCRIPTION OF THE DRAWINGS

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the drawings, specific terminology may be used for the sake of clarity. However, the aspects of the disclosure are not intended to be limited to the specific terms used.

FIG. 2 is an example of a URL and customized links in accordance with aspects of the disclosure.

FIG. 6A illustrates an example namespace for a destination object in accordance with aspects of the disclosure.

FIG. 6B illustrates an example of the match and destination steps for a component of the namespace in FIG. 6A.

FIG. 8 is example code for determining support for URL customization in accordance with some embodiments of the disclosure.

DETAILED DESCRIPTION

Overview

Figure 1:
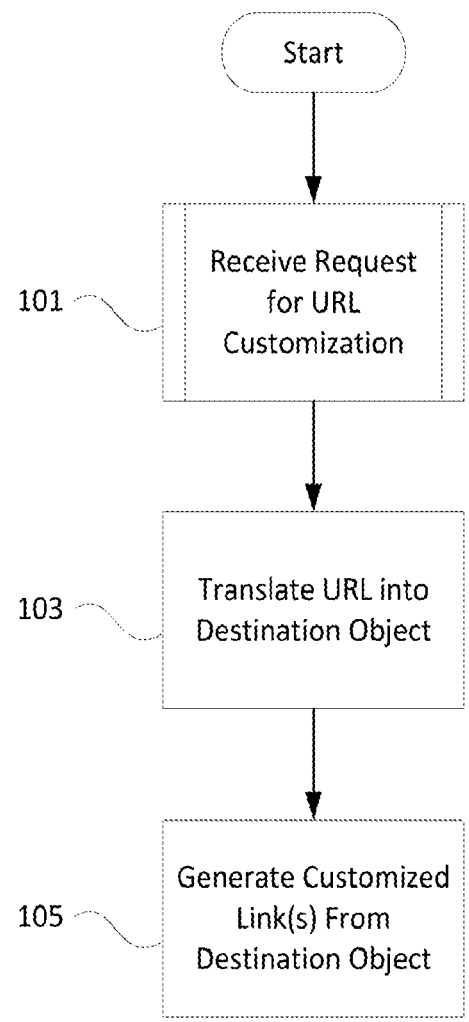
FIG. 1 is a flow diagram of URL customization in accordance with aspects of the disclosure.

This technology relates to converting uniform resource locators (URLs) into customized links to a particular destination. In this regard, a URL may be exchanged for a customized link, where the customized link may be an enriched version of the URL. The customized link may direct a user to particular destination, such as a destination in a native or web based application suited to serve the user's needs. For example, and as illustrated in block 101 of flow chart 100 in FIG. 1, a request for a customized link corresponding to a URL may be received. Customization may include exchanging, or otherwise enriching, the URL for (or into) a customized link. In some instances, more than one customized link may be provided.

An example request 201 and corresponding URL 211 received for customization is shown in FIG. 2. After receiving the request 201, the URL may be translated into a destination object, as shown in block 103. As described herein, the destination object is a structured object that provides additional data used to generate the customized link. A customized link may then be generated based on the data in the destination object as shown in block 105. FIG. 2 illustrates an example response 220 in which customized links 221-223 are generated based on a destination object created from the URL 211 in request 201. As further shown in FIG. 2, the customized links include a link to a web location 221, a link to an IOS app 222, and a link to an Android app 223. In some instances the customized links may be limited to the platform or device on which the request is transmitted from. For instance, a request received from a device running Android may receive a link to the web location 221 and the Android app 223, but not the link to the IOS app 222.

A publisher may utilize a service to provide customized links to a user of an application. In this regard, an application developed and distributed by the publisher may be configured to request customized links for some or all URLs selected by a user of the application. For example, the publisher's application may provide a listing of content, such as products, offered by one or more companies on a user device. Each product may have a corresponding button, or other such selectable icon, that when selected navigates the user's device to a particular URL associated with the product on the offering company's website. In some instances, one or more products may share a particular URL. Upon the application receiving a selection of one of the links, the application may request the URL associated with the link be converted into customized links. The service may return to the application customized links, such as a deep link to the product in a native application of the company offering the product and a web URL.

The application may determine which customized link to follow and present to the user. For instance, the application may determine the native application of the company offering the product is unavailable on the user's device. As such, the application may direct the user's device to the web URL. In some instances, the application may present the web page associated with the web URL in an embedded browser in the application, or in another web browser on the user device. In the event the application includes the native application of the company offering the product, the application may direct the user's device to the deep link such that the user device provides the selected product to the user in the native application. In another example, where the user's device does not include the native application, the application may provide an option for the user to install the native application, such as by directing the user device to a 'Store' (e.g., an "App" or "Application" store) or providing the user with the option to install the native application without the need to visit an Application Store. After completion of the installation of the native application, the application may direct the user's device to the deep link such that the user device provides the selected product to the user in the native application.

A publisher may utilize the service to provide customized links to a user of a web page. In this regard, the service may provide unique URLs associate with content on a publisher's website. The unique URLs may include a host location associated with the brand. For instance, the unique link for a particular product may be—http://walmart.bttn.io/search/?cat_id=2636_1224908_1224995—where "walmart.bttn.io" is a host that is operated by service Button. Upon a user selecting a button, or other such selectable icon, corresponding to the unique link, the service may receive a request to provide a customized link for the user's device. In some instances, the customized link may be generated prior to the user selecting the button or other such selectable icon. The service may return customized links to the user's device, such as a deep link to the product in a native application of the company offering the product associated with the unique link and a link including a web URL. The application may determine which customized link to follow and present to the user, as previously discussed.

By providing customized links, the service may enable deep linking from a URL that otherwise would not support it. Additionally, the customized links may allow a user device to navigate between applications, such as from a publisher's application to a company's native application. Moreover, customized links may provide tracking that enables commissioning for publishers and the service. Although the examples discussed herein refer to the customization of URLs, the systems and methods described herein may be applied to other resource locator types.

Example Systems

Figure 3:
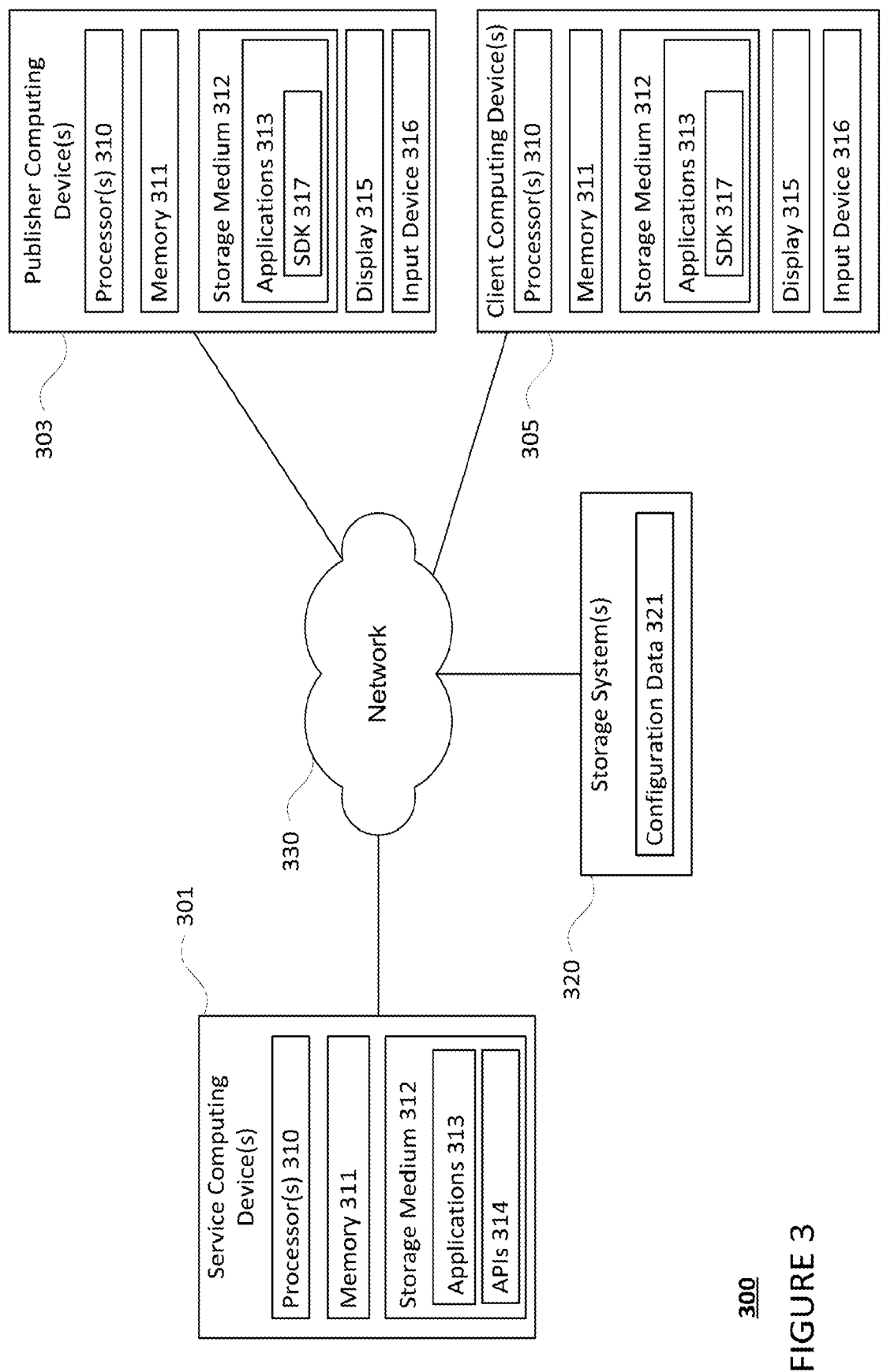
FIG. 3 is an example computing system in accordance with embodiments of the disclosure.

FIG. 3 shows an example distributed computing system 300 in which the features described herein may be implemented. In this example, system 300 includes service computing device 301, publisher computing device 303, and client computing device 305, which may be collectively referred to as computing devices. The distributed computing system 300 may also include storage device 320. Communication between the computing devices 301-305, as well as between the computing devices 301-305 and storage device 320 and other devices, may be performed through network 330, as described herein. FIG. 3 should not be considered as limiting the scope of the disclosure or usefulness of the features described herein. In this regard, this features described herein may be implemented with many types of general or special purpose computing device, such as personal computers, laptops, tablets, mobile phones, virtual computers, etc. Further, the features described herein may be implemented using many different combinations of devices.

Each computing device 301-305 can contain one or more processors 310, one or more memory 311, one or more storage medium 312, and/or other components commonly found in general and special purpose computing devices. Although not shown, communication between memory 311, storage medium 312, and processor 310 may be made through one or more communication buses.

The one or more processors 310 can be any conventional processors, such as commercially available CPUs from Intel®, AMD®, or Apple®. Alternatively, or in addition to the commercially available CPUs, the processors can be dedicated components such as an application specific integrated circuit ("ASIC") or other hardware-based processors, such as an ARM processor, field programmable gate array (FPGA), or System on Chip (SoC).

Each computing device 301-305 may include computer readable media, such as memory 311 and storage medium 312. Computer readable media may include both volatile and nonvolatile media that is readable and/or writable by the computing devices 301-305. For instance, computer readable media may include disk based hard drives, solid state hard drives, hybrid hard drives, memory cards, flash read-only memory (ROM), random access memory (RAM), DVDs, CD-ROMs, EEPROM, and other magnetic or optical storage.

Memory 311 may store and provide data and instructions that can be retrieved, executed, and/or manipulated by a processor. The memory 311 can be any computer readable media, such as ROM or RAM. The instructions and data stored by memory 311 may be those that require immediate access by the processors 310, such as data and instructions that are currently being processed or operated on. In some instances, the instructions and data stored by memory 311 may be those that are commonly executed or processed by the processors. In this regard, delays with retrieving the commonly executed instructions and data may be reduced compared to when the commonly executed instruction and data are stored at a more remote location, such as in storage medium 312.

The instructions may be stored in any format which may be read and executed by the processor and may include any executable code, such as machine code, scripts, applications, etc. Applications may include, for instance, an operating system (OS), mobile applications, computer applications, etc. In some instances, instructions may include portions of executable code, such as application modules which are part of a larger application.

The data is not limited to any particular data structure or format. For instance, the data can include individual pieces or data as well as larger data structures such as relational databases, tables, XML documents, etc. Additionally, the data may be formatted in many formats such as, but not limited to, binary values, ASCII or Unicode.

Storage medium 312 may be configured to store data and instructions. For instance, storage medium 312 may include applications, such as an operating system (OS), mobile applications, computer applications, etc., as well as other data and instructions. In some instances, the storage medium 312 may store some or all of the same data and instructions as found in memory 311. The storage medium 312 and/or memory 311 may also include one or more APIs and/or SDKs. For instance and as further illustrated in FIG. 3, the storage medium 312 of service computing device 301 may include one or more APIs 314, such as the conversion API discussed herein. As further illustrated in FIG. 3, the storage medium 312 of publisher computing device 303 and client computing device 305 may include SDK 317, which may enable communication with API 314. Although SDK 317 is shown as being within application 313, SDK 317 may be a standalone application.

Although FIG. 3 illustrates the processor 310, memory 311, storage medium 312, and other elements of computing devices 301-305 as being within the same device, the processor 310, memory 311, storage medium 312, and other elements of computing devices 301-305 may be stored in different housings. For example, and referring to service computing device 301, the processor 310, and memory 311 may be located in a different housing from storage medium 312. Accordingly, references to a processor, computer, computing device, memory, or storage medium will be understood to include references to a collection of processors, computers, computing devices, memories, or storage mediums that may or may not operate in parallel. For example, the service computing device 301 may include server computing devices. The service computing device 301 may be configured to operate as a load-balanced server farm, distributed system, etc. Similarly, publisher computing device may be configured as a server. Yet further, although some functions described below are indicated as taking place on a single computing device having a single processor, various aspects of the subject matter described herein can be implemented by a plurality of computing devices, for example, communicating information over network 330.

Storage system 320 can include any type of storage capable of storing information accessible by the service computing device 301, publisher computing device 303, and/or client computing device 305. As shown in FIG. 3, storage system 320 may store configuration data 321. Configuration data 321 may include data used to enrich, or exchange, a received URL into a customized URL, as described herein.

Storage device 350 may include a distributed storage device where data is stored on a plurality of different storage devices which may be physically located at the same or different geographic locations, such as network attached storage. Storage device 350 may be connected to the computing devices via the network 360 as shown in FIG. 3, and/or may be directly connected to any of the computing devices 301-305. Although only a single storage system 320 is shown in FIG. 3, any number of storage systems may be included in the example distributed computing system 300. In some instances, access to storage system 320 may be limited to particular computing devices. By way of a non-limiting example, storage system 320 may be configured to communicate with client computing device 305 and service computing device 301, but not publisher computing device 303. In some instances, a storage system may be provided for each computing device.

Each of the computing devices 301-305 can be at different nodes of a network 330 and capable of directly and indirectly communicating with other nodes of network 330. Although only computing devices 301-305 are depicted in FIG. 3, it should be appreciated that a typical system can include a large number of connected computing devices, with each different computing device being at a node of the network 330. The network 330 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi, HTTP, 3G, 4G, 5G, Bluetooth, and UDP protocols that are proprietary to one or more companies, and various combinations of the foregoing. Although certain advantages may be obtained when information is transmitted or received as noted above, other aspects of the subject matter described herein are not limited to any particular manner of transmission of information.

As an example, service computing device 301 may include web servers capable of communicating with storage system 320 as well as computing devices 303 and 305 via the network 330. The web servers of service computing device 301 may use network 330 to transmit and present information to a user, such as on a display 315 of client computing device 305.

Each of the computing devices 303 and 305 may be configured similarly to the server computing devices 310, with one or more processors, memory, and storage mediums as described above. Computing devices 320 and 330 may be a personal computing device intended for use by a user, and have all of the components normally used in connection with a personal computing device such as a central processing unit (CPU), memory (e.g., RAM and internal hard drives) storing data and instructions, a display such as display 315, (e.g., a monitor having a screen, a touch-screen, a projector, a television, or other device that is operable to display information), and input device 316 (e.g., a mouse, keyboard, touch-screen, or microphone). Although not shown, service computing device 301 may also include displays and user input devices. The computing devices 301-305 may also include a network interface device, and any other components used for connecting these elements to one another.

Although the computing devices 303 and 305 may each comprise a full-sized personal computing device, they may alternatively comprise mobile computing devices capable of wirelessly exchanging data with a server, such as service computing device 301 over a network such as the Internet. By way of example only, client computing device 305, may be a mobile phone or a device such as a wireless-enabled PDA, a tablet PC, or a netbook. In another example, client computing device 305 may be a laptop computer.

Example Methods

In addition to the operations described above and illustrated in the figures, various operations will now be described. The following operations do not have to be performed in the precise order described below. Rather, various steps can be handled in a different order or simultaneously, and steps may also be added or omitted.

Referring back to flow chart 100 of FIG. 1, the request for URL customization, shown in block 101, may be received by a service, such as at service computing device 301. In this regard, the request may be made by a publisher or a user of a publisher's website or application. In this regard, the publisher computing device 303 or the client computing device 305 may transmit the URL customization request via SDK 317 to API 314, which may be a conversion API. As previously explained, there may be many publisher computing devices and/or client computing devices capable of requesting URL customization requests. Moreover, there may be more than one service computing devices capable of handling the URL customization requests.

Figure 4:
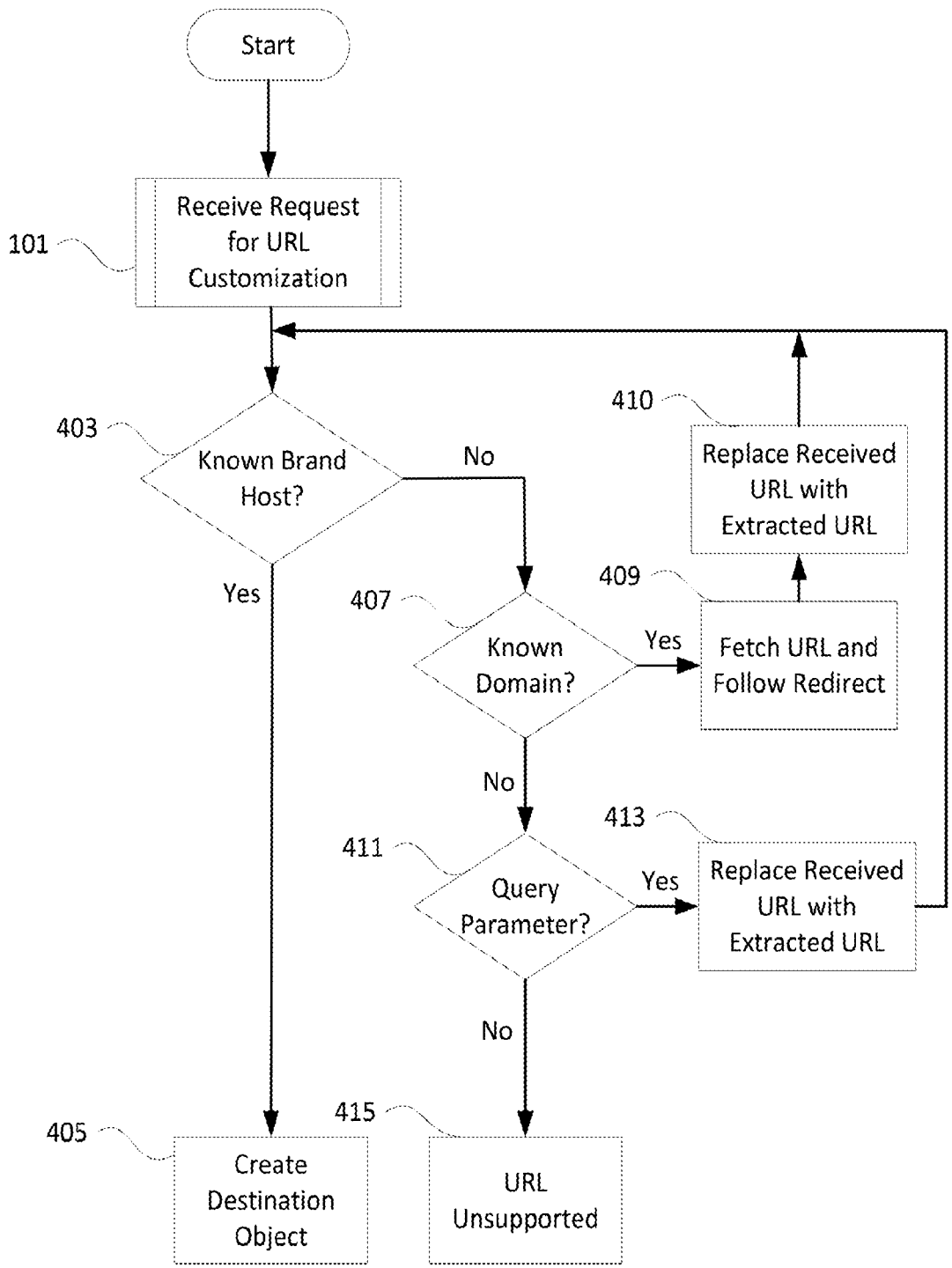
FIG. 4 is a flow diagram of translating the URL into a destination object and generating customized links in accordance with aspects of the disclosure.

Upon receiving the request for URL customization the service computing device 301 may translate the URL associated with the request into a destination object and generate customized links, as shown in blocks 103 and 105 in FIG. 1. Flow chart 400 of FIG. 4 shows the steps the service computing device 301 may take in performing blocks 103 and 105. For instance, after receive the URL customization request the service computing device 301 may determine if the URL contains a known brand host, as shown in step 403. If the brand host is known, a destination object is created by translating the URL, as shown in step 405 and further described herein. A list of known brand hosts may be stored in configuration data on a storage system, such as configuration data 321 on storage system 320. Alternatively, the list of known brand hosts may be stored on the service computing device 301 or any other location accessible by the service computing device 301. To determine if the brand host is known, the service computing device 301 may compare the brand host of the received URL to the list of brand hosts to determine if there is a match, indicating the received brand host is known.

If the brand host is not known, the service computing device 301 may determine if the domain of the URL is known, as shown in step 407. If the domain is known, the URL may be fetched and the service computing device may follow redirects until a final destination having a final URL is reached, as shown in step 409. In some instances, even when the domain is unknown, the URL may be fetched and the service computing device may follow redirects until a final destination having a final URL is reached, as shown in step 409. The received URL may then be replaced with the final URL, as shown in block 410. The final URL may then be processed through the steps of flow 400, starting with step 403. A list of known domains may be stored in the configuration data. To determine if the domain is known, the service computing device 301 may compare the domain of the received URL to the list of known domains to determine if there is a match, indicating the received domain is known and that URL redirections should be followed.

In some instances, the received URL or the final URL may include a query parameter including an alternative URL. In this regard, if step 407 fails, the service computing device, SDK, or other such software or computing device, may determine whether the received or final URL includes a query parameter having an alternative URL, as shown in step 411. The received or final URL may be replaced with the alternative URL if available, as shown in step 413. The alternative URL may then be run through the steps of flow chart 400. Although step 411 is shown as occurring after step 407 in FIG. 4, step 411 may occur before or simultaneously to step 407.

In the event a known brand host is not detected, the service computing device 301 may return a message indicating that the URL is not supported for customization as shown in block 415.

Figure 5:
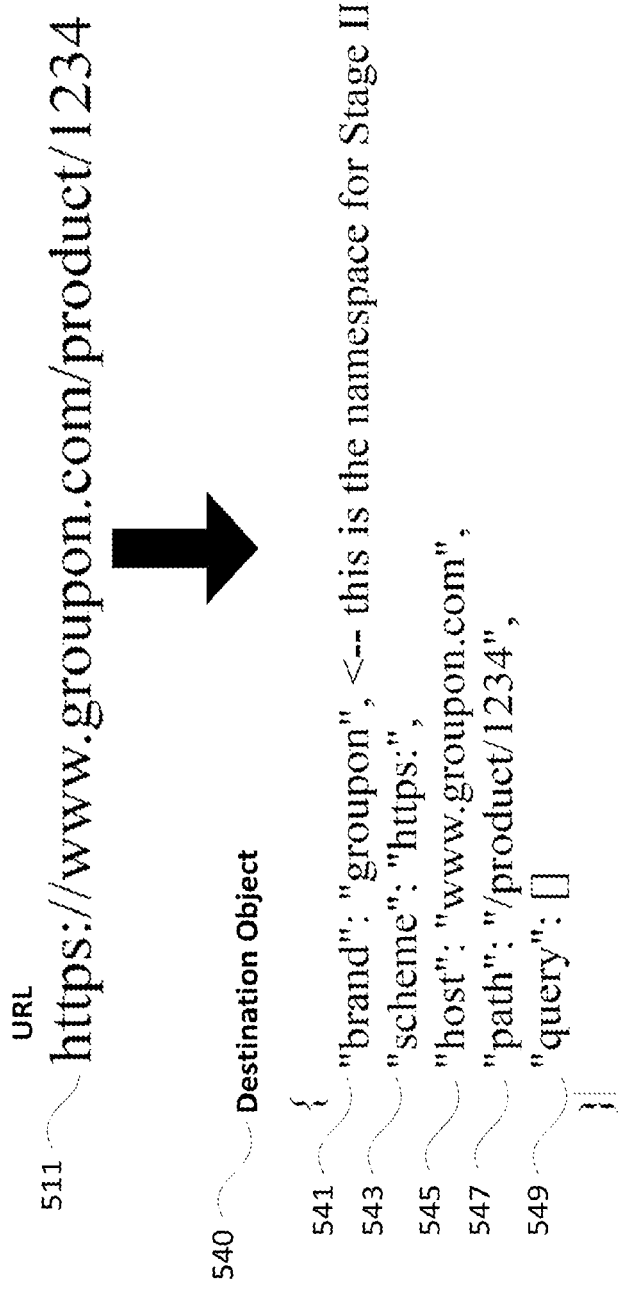
FIG. 5 is an illustration of a destination object being created from a URL in accordance with aspects of the disclosure.

FIG. 5 illustrates the creation of a destination object 540 from a received URL 511. In this regard, the received destination object may include data such as a brand 541, scheme 543, host 545, path 547, and query 549, as well as other normalized data extracted from a URL, such as a product identifier. All of the data in the destination object 540 may be determined from the received URL or configuration data. For instance, the configuration data 321 may include a mapping of domains to brand namespaces. Based on a determined domain from the URL, the service computing device 301 may determine a brand namespace which the determined domain maps to. This brand namespace may be assigned to brand 541. The other data, such as scheme, host, path, and query may be directly pulled from the received URL, or may also have a particular mapping in the configuration data 321.

After creating the destination object 540, the service computing device 301 may take the destination object 540 and translate it for a target platform, such as the platform (e.g., Android, IOS, web, etc.) utilized by the client computing device 105. Translation of the destination object 540 may be based on the namespace in the destination object 540. In this regard, each namespace may have components that define steps to be executed to form the customized links. For example, and as shown in FIG. 6A, the namespace 641 for destination object 540 may include components 652, 653, and 654.

The step for each component 652-654 may include a match step and a destination step. The match step may determine whether the needed conditions for performing the step are met and the destination step may be a function that manipulates the destination to execute the step. FIG. 6B illustrates an example of the match and destination steps for component 652 of namespace 641. In the example of FIG. 6B, there are two steps to the pipeline, with each step being configured to match a different case. The two steps are as follows:

Step 1 662: Match if the destination's path is "/", that is, match if the destination's path is a home page link. If match step succeeds, replace the path with "/home", which, in this case is the path that the application on the client device is expecting Step 2 663: Match a URL pattern matching "/product/:id". If match step succeeds, take that ID and put it in a query parameter "product_id", which is where the application on the client device looks for it.

The translated destination object may be composed into customized links by combining the destination.scheme, destination.host, destination.path, and destination.query parameters corresponding to the brand 541, scheme 543, host 545, path 547, and query 549 of the destination object 540. The customized links may be sent in a response to the client computing device 105.

The client computing device 305 may receive the response including the customized links Once the client has received a response from the service computing device, with the customized links, the client computing device may process the response and choose the appropriate destination. That is to say, the client computing device may determine the appropriate customized link to follow. In this regard, the response may include metadata that instructs the client computing device 105 how to prioritize which customized link to follow given variables known and unknown to the service computing device 301. For example, the service computing device 301 may instruct the client computing device 305 to open an embedded browser inside a host application if the native application identified in the customized link is not installed on the device. In another example the service computing device 301 may instruct the client computing device 305 to install the native application if it is not installed. In yet another example, the service computing device 301 may be aware of an issue in the customized link corresponding to the native application app, and instruct the client computing device 305 not to use that customized link and instead open the destination in an embedded browser or the client computing device's native browser.

Figure 7:
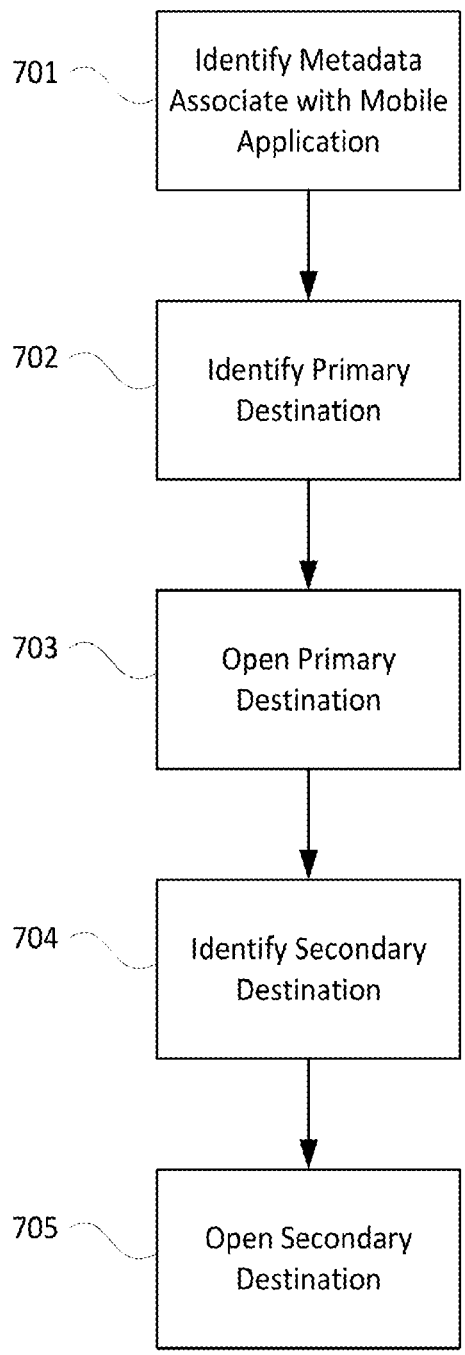
FIG. 7 shows a table of steps that the client computing device may take in accordance with aspects of the disclosure.

FIG. 7 shows the steps (1-5) that the client computing device 305 may take to determine which customized link to follow. As shown in step 701, the client computing device 305 may identify metadata associated with the customized links that correspond to a native application (e.g., mobile application). Accurate metadata is necessary to successfully link to the native application and/or a proper page in an app store to install the native app. Non-existence of mobile app information would eliminate the app and the app store as eligible destinations. In the event metadata associated with the native app is included, a determination may be made whether the customized link associated with the native application is a primary destination, or if another customized link should be a primary destination, as shown in block 702. As shown in block 703, the customized link associated with the primary destination may be opened by the client computing device. Often, the primary destination is the native app, but there may be situations where the embedded browser or native browser is the primary destination.

Referring to block 704, if the primary destination is unavailable, such as when the native app is not installed or the page does not exist within the mobile native app, a secondary destination may be identified. The secondary destination may be a fallback location that was not the primary destination, such as the native app when the native app is not identified as the primary destination, the embedded browser, native browser, and/or app store. The client computing device 305 may then open the secondary destination, as shown in block 705.

In some instances, the client computing device 305 may communicate with the APIs, such as the conversion API, of the service computing device 301 through an SDK 317 to ensure a good user experience, limit user's data usage with their carrier, and limit client device energy consumption. For example, synchronous evaluation on the client computing device 305 at click time may minimize wait time to a user of the client computing device 305 in the case where a request for customized URL cannot be completed. In this regard, the client computing device may continue to the destination of the URL, without any customization and/or without the need for round-trip communication with the service computing device 301. In another example, a publisher's website, web client, web app etc., may pre-determine the whether one or more URLs on a page may be exchanged or enriched for a customized URL without the need to conduct round-trip communication with the service computing device 301.

With synchronous evaluation, a client computing device 305 may periodically "check in" with the service computing device 301 for configuration instructions. Among other things, the instructions may include a domain specific language (DSL) that describes to the client computing device how to evaluate URLs locally for compatibility with the conversion API. In this regard the client computing device may follow an algorithm to determine support for a given URL which is similar to Stage 1 on the server side.

Figure 9:
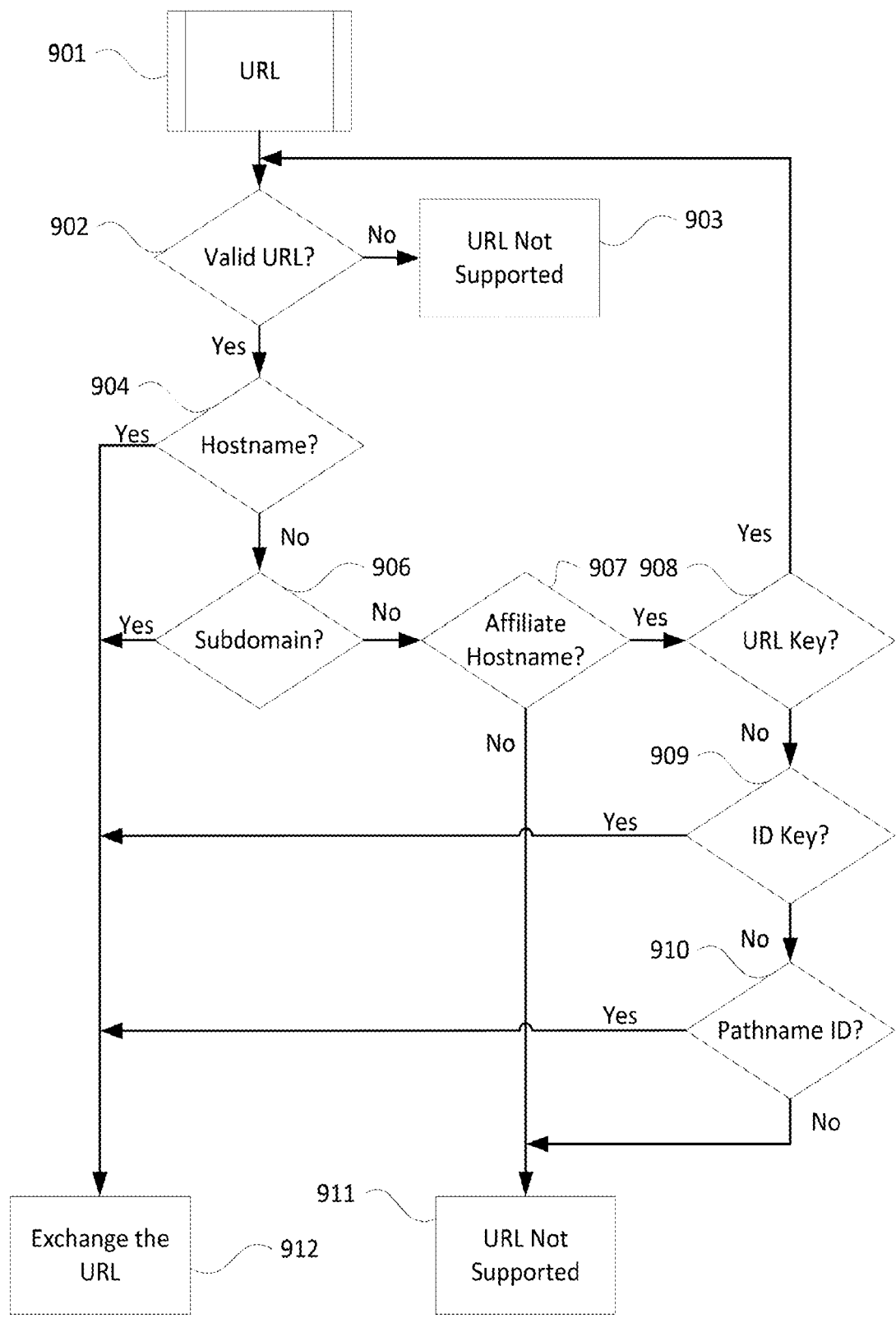
FIG. 9 shows a table including chart a client computing device may follow in accordance with aspects of the disclosure.

FIG. 8 shows example code for determining support. FIG. 9 shows a flow chart that a client computing device may follow to determine support for a URL using the instructions, such as the DSL instructions, obtained via periodic check-ins. At each step in the table, the service computing device 301 may alternatively instruct the client computing device 305 to use a regular expression to evaluate against the URL for a match. As shown in FIG. 9, a URL 901 may be checked to determine whether the URL is valid, as shown in block 902. If the URL is invalid, the client computing device may determine that the URL is not supported, as shown by block 903. In the event the block is found valid, an input integrity check may be made to determine whether the URL is a valid URL.

In the event the URL is found to be valid, the hostname of the URL 901 may be compared against known supported hostnames, as shown in block 904 to determine if there is a match. In this regard, the client computing device 305 may format the hostname by removing text, such as "www." and lowercasing the remaining text. The comparison of the hostname may be a strict comparison, requiring an exact match between the formatted hostname and one of the known supported hostnames. A list of supported hostnames may be stored locally or remotely, such as on service computing device 301. In the event a match is made, the process may move to step 912, as further shown in FIG. 9.

In the event a hostname match is not made, the process may move to step 906, where the subdomain of the URL may be compared against all supported subdomains to determine if there is a match. A list of supported domains may be stored locally on the client computing device 305 or remotely, such as on service computing device 301. In the event a match is made, the process may move to step 912, as further shown in FIG. 9.

In the event a subdomain match is not made, the process may move to step 907, where a comparison of the hostname of the URL may be compared against all supported affiliate hostnames, which may be stored locally or remotely, to determine whether there is a match. If no match is made, the process may move to step 911 where a determination that the URL is not supported may be made. In the event the hostname is matched to an affiliate hostname, the process may move to step 908.

In steps 908-910 alternative ways of resolving the URL's intended destination when not included in the URL are shown. These steps are recursive, in that if an inferred URL is determined, it passes the inferred URL back to 902 for further processing. Referring to step 908, for each supported query URL key, an attempt to extract the value for that key from the URL may be made. For example, the URL may be:

"https://www.somedomain.com?the_real_url=https://anotherdomain.com"

The supported query URL key of "the_real_url" which is known for the domain "www.somedomain.com", the client computing device may look to find the URL to follow the supported query URL key. In this regard, the client computing device 305 may look for "the real url" within the URL and a URL that follows. If the value is found, the URL that follows the value may be used as an input into step 902. If a value is not found, the process may move to step 909.

In step 909, for each supported query ID key, an attempt to extract the value for that ID key from the URL may be made. For example, a URL may be:

https://www.somedomain.com?target_retailer=123

In this case, the client computing device 305 may determine that (i) The domain "somedomain.com" supports a well-known key "target_retailer," (ii) The "target_retailer" key matches a well-known list of values (ID keys), and (iii) The value of the ID key "123", for instance, may map to "walmart.com". If the value is found for the ID key, the process may move to step 912. If a value is not found for a key, the process may move to step 910. In some instances, a flag may be specified to inform the client computing device 305 that a match does not guarantee a successful URL exchange will occur. In this case, the user of the client computing device 305 may shortcut further evaluation and jump to step 911.

In step 910, for each supported pathname Id, a comparison may be made with the URL. If there is a match, the match groups may be compared against each candidate group. If there is no match, the process may move to step 911. Otherwise, in the event of a match, the process may move to step 912, where the URL will be submitted for exchange with one or more customized URLs.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for uniform resource locator (URL) customization, the method comprising:
  receiving, by one or more processors, a request for URL customization;
  determining, by the one or more processors, whether a URL associated with the request contains a known host by comparing a host of the URL to a list of known hosts;
  translating, by the one or more processors, the URL associated with the request into a destination object; and
  generating, by the one or more processors, based on the destination object, one or more customized links.

2. The method of claim 1, wherein the destination object includes one or more of a brand, scheme, host, path, or query.

3. The method of claim 1, further comprising, when the URL associated with the request is determined not to have a known host, determining whether the URL associated with the request contains a known domain by comparing a domain of the URL to a list of known domains.

4. The method of claim 3, further comprising, when the URL associated with the request is determined to have an unknown domain, determining whether the URL associated with the request includes a query parameter having an alternative URL.

5. The method of claim 4, further comprising replacing the URL associated with the request with the alternative URL.

6. The method of claim 1, further comprising, when the URL associated with the request is determined to have a known host, fetching an updated URL and replacing the URL associated with the request with the updated URL.

7. A system comprising:
  one or more processors; and
  memory storing instructions, the instructions, when executed by the one or more processors, cause the one or more processors to perform operations comprising:
  receiving a request for URL customization;
  determining whether a URL associated with the request contains a known host by comparing a host of the URL to a list of known hosts;
  translating the URL associated with the request into a destination object; and
  generating, based on the destination object, one or more customized links.

8. The system of claim 7, wherein the destination object includes one or more of a brand, scheme, host, path, or query.

9. The system of claim 7, wherein the operations further comprise:
  determining, when the URL associated with the request is determined not to have a known host, whether the URL associated with the request contains a known domain by comparing a domain of the URL to a list of known domains.

10. The system of claim 9, wherein the operations further comprise:
  determining, when the URL associated with the request is determined to have an unknown domain, whether the URL associated with the request includes a query parameter having an alternative URL.

11. The system of claim 10, wherein the operations further comprise replacing the URL associated with the request with the alternative URL.

12. The system of claim 7, wherein the operations further comprise:
  fetching, when the URL associated with the request is determined to have a known host, an updated URL and replacing the URL associated with the request with the updated URL.

13. One or more non-transitory computer-readable storage media comprising instructions that when performed by one or more processors, causes the one or more processors to perform operations comprising:
  receiving a request for URL customization;
  determining whether a URL associated with the request contains a known host by comparing a host of the URL to a list of known hosts;
  translating the URL associated with the request into a destination object; and
  generating, based on the destination object, one or more customized links.

14. The non-transitory computer-readable storage media of claim 13, wherein the destination object includes one or more of a brand, scheme, host, path, or query.

15. The non-transitory computer-readable storage media of claim 13, wherein the operations further comprise:
  determining, when the URL associated with the request is determined not to have a known host, whether the URL associated with the request contains a known domain by comparing a domain of the URL to a list of known domains.

16. The non-transitory computer-readable storage media of claim 15, wherein the operations further comprise:
  determining, when the URL associated with the request is determined to have an unknown domain, whether the URL associated with the request includes a query parameter having an alternative URL.

17. The non-transitory computer-readable storage media of claim 16, wherein the operations further comprise replacing the URL associated with the request with the alternative URL.

* * * * *